F. J. McAVOY.
LOCKING DEVICE FOR ECCENTRIC BUSHINGS.
APPLICATION FILED SEPT. 30, 1919.
1,348,022.
Patented July 27, 1920.
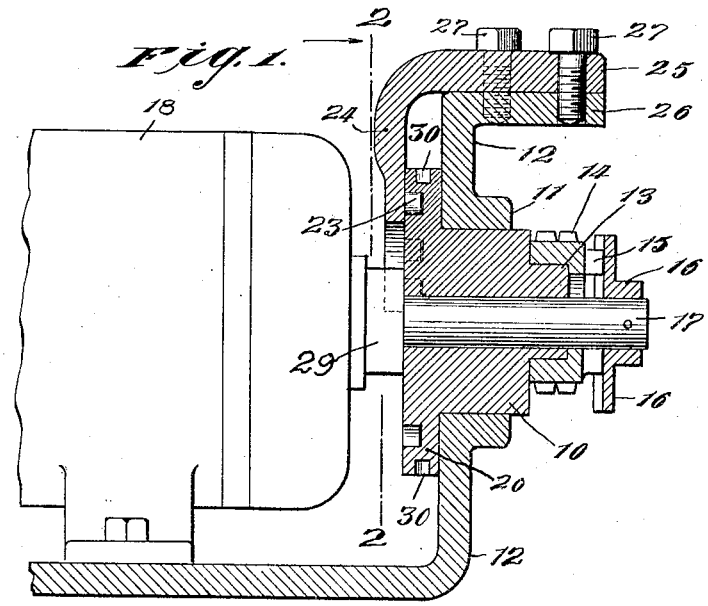
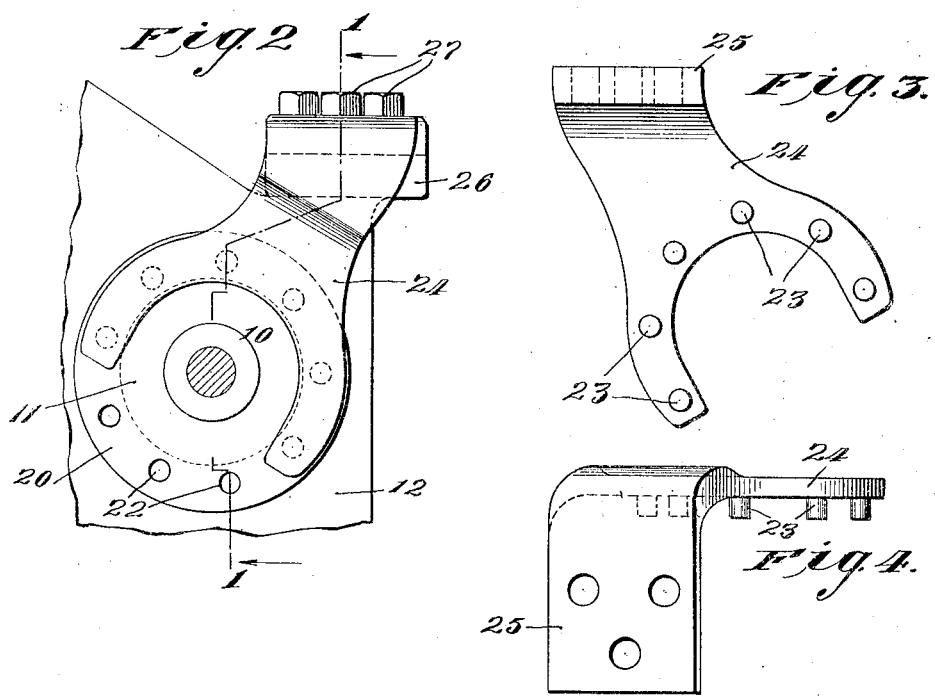
WITNESSES
INVENTOR
FRANCIS JOSEPH McAVOY
BY
ATTORNEYS

UNITED STATES PATENT OFFICE.

FRANCIS JOSEPH McAVOY, OF NEWARK, NEW JERSEY.

LOCKING DEVICE FOR ECCENTRIC BUSHINGS.

1,348,022.        Specification of Letters Patent.     Patented July 27, 1920.

Application filed September 30, 1919. Serial No. 327,382.

*To all whom it may concern:*

Be it known that I, FRANCIS JOSEPH MCAVOY, a citizen of the United States, and a resident of Newark, in the county of Essex and State of New Jersey, have invented a new and Improved Locking Device for Eccentric Bushings, of which the following is a full, clear, and exact description.

The invention in its general aspect relates to internal combustion motors such as are used in automobiles and other vehicles.

The object of the invention is to provide a new and improved locking device for a bushing provided with an eccentric on which is journaled a sprocket wheel engaged by a sprocket chain to be tightened, the said sprocket wheel being connected with the shaft of the motor generator and the sprocket chain being driven from the motor shaft and driving the motor cam shaft and the ignition timer shaft.

Another object is to permit of quickly unlocking the eccentric bushing with a view to tighten the sprocket chain whenever it is necessary to do so.

Another object is to permit of unlocking and turning the eccentric bushing without requiring disassembling of the adjacent parts of the motor.

Another object is to permit of attaching the locking device to motors as now constructed.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the locking device as applied, the section being on the line 1—1 of Fig. 2;

Fig. 2 is a cross section of the same on the line 2—2 of Fig. 1;

Fig. 3 is a face view of the locking device; and

Fig. 4 is a plan view of the same.

In internal combustion engines as now generally constructed, it is occasionally necessary to tighten the sprocket chain driven from the motor shaft and driving the generator shaft, the motor cam shaft and the ignition timer shaft. The sprocket wheel connected with the generator shaft is journaled on an eccentric bushing and when it becomes necessary to tighten the sprocket chain then the bushing is unfastened and turned to correspondingly shift the sprocket wheel with a view to tighten the sprocket chain. The means heretofore employed for fastening the bushing in place made it necessary to disassemble a number of adjacent parts of the motor in order to allow turning of the bushing and tightening of the sprocket chain. In practice, this operation usually consumed several hours. With my improvement presently described in detail the adjustment can be made in about ten minutes, as disassembling of the parts of the motor is not necessary.

The bushing 10 is mounted to turn in a bearing 11 forming part of the motor frame 12, and the bushing is provided at its outer end with an eccentric 13 on which is mounted to turn the motor generator sprocket wheel 14, connected by a sprocket chain (not shown) with sprocket wheels on the motor cam shaft, which actuates the valves and drives the ignition timer shaft. The motor generator sprocket wheel 14 is further provided with a coupling member 15 slidingly connected with a coupling member 16 secured on the shaft 17 of the motor generator 18 to actuate the latter.

The bushing 10 is provided with a flange 20 fitting against the inner face of the bearing 11 and spaced a short distance from the motor generator 18, as plainly shown in Fig. 1. The face of this flange 20 is provided with spaced recesses 22 arranged in a circle concentric with the peripheral face of the flange 20, and sundry of these recesses 22 are engaged by lugs or pins 23 formed on one face of a locking member 24 provided with an angular flange 25 fitting on a top 26 of a portion of the motor frame 12 directly above the bushing 10. Bolts 27 or other suitable fastening devices engage the flange 25 and screw in the top 26 to securely fasten the locking member 24 in place. It will be noticed that by the arrangement described, the pins 23 in engagement with the recesses 22 hold the bushing 10 against turning in the bearing 11. When it is desired to turn the bushing 10 in its bearing 11 for tightening the sprocket chain passing over the sprocket wheel 14, then it is only necessary for the operator to remove the bolts 27 and thus unfasten the locking member 24, which can now be moved to the left with a view to disengage the pins 23 from the recesses 22. The locking member 24 is in the shape of a fork and straddling the hub 29 of the motor generator 18 to allow convenient removal of the locking member without disturbing any of the other parts. The bushing 10 is now unlocked and can be turned readily by the application of a spanner wrench or other suitable tool engaging recesses 30 formed in the peripheral face of the flange 20 of the eccentric bushing. After the bushing has been turned and the sprocket chain tightened then the locking member 24 is replaced and its pins 23 are engaged with a corresponding set of registering recesses 22 to hold the bushing 10 against turning. The locking member is then fastened in place by bolts 27. It is understood that very little room is had between the bushing 10 and the motor generator 18 to accommodate the locking member 24 and allow its removal.

From the foregoing it will be seen that by the arrangement described the operator is enabled to quickly unlock the bushing 10 with a view to turn the same for tightening the sprocket chain.

It is understood that I do not limit myself to the means shown for fastening the locking member 24 in place on the motor frame 12, as other suitable means may be employed for the purpose, and I also do not limit myself to the pins 23 and recesses 22 shown and described for locking the bushing in place and other suitable and quickly removable locking means may be employed.

Having thus described my invention, I claim as new and desire to secure by Letters Patent:—

1. In an internal combustion motor, an eccentric bushing mounted to turn in a fixed bearing, and a detachable locking member adjacent one face of the bushing, the said bushing and the said locking member having a plurality of interlocking members to hold the bushing against turning in any one of a series of adjusted positions.

2. In an internal combustion motor, an eccentric bushing provided with spaced recesses arranged in a circle concentric to the peripheral face of the bushing, and a locking member provided with pins adapted to engage sundry of the said recesses.

3. In an internal combustion motor, a motor frame provided with a bearing and a top flange, an eccentric bushing journaled in the said bearing and provided with a flange fitting against the inner side of the said bearing, the flange being provided with spaced recesses arranged in a circle concentric with the peripheral face of the bushing, a locking member having a fork provided with pins engaging sundry of the said recesses, the said locking member having an angular flange, and fastening means detachably fastening the said locking member flange to the said frame top flange.

FRANCIS JOSEPH McAVOY.